3,070,500
PROCESS FOR PREPARING STABLE ALCOHOLIC EMULSION OF GRAPE SUGAR
Carl Heinz Buer, 159 Eupenerstrasse,
Koln-Braunsfeld, Germany
No Drawing. Filed July 11, 1956, Ser. No. 597,093
Claims priority, application Germany July 12, 1955
1 Claim. (Cl. 167—65)

This invention relates to improved complex compounds of glycerine di-fatty acid phosphoric acid amino alcohol esters. The present invention relates furthermore to a new and improved process for the preparation of said compounds. The invention is characterised by the feature that the esters are allowed to act on a hot solution of sugar in aqueous alcohol with stirring.

The complex compounds are not soluble in aqueous alcohol, but they form therewith extremely stable emulsions.

Grape sugar is preferably used for the formation of complex compounds. The most favourable temperature for carrying out the reaction has proved to be 82–87° C. It is possible to start from glycerine-1:2-di-fatty acid-3-phosphoric acid amino alcohol ester, and from glycerine-1:3-di-fatty acid-2-phosphoric acid amino alcohol or from homologue esters.

It is known that glycerine-di-fatty acid-phosphoric acid amino alcohol esters and their homologues are now used in therapeutics for the treatment of hepatic and cardiac disturbances, as also nervous debility. The use thereof met with the difficulty, however, that it was not possible to manufacture sufficiently concentrated preparations. The present invention removes this difficulty in that it permits more than 10% stable emulsions of complex componds of the ester to be obtained preferably with a sugar content of at least 6%.

The complex compounds are formed only at elevated temperature. It is desirable to carry out the process by adding the esters, preferably warmed, to a highly heated sugar solution in a mixture of alcohol and water. With vigorous stirring the formation of the stable emulsion immediately occurs. If, on the other hand, the components are mixed at room temperature, the complex compounds are not formed. Even if such a mixture is slowly heated, the complex formation takes place only very incompletely and neither the desired concentrations nor a stable emulsion is obtained.

*Example*

A 10% grape sugar solution is heated to boiling in a container provided with a stirring mechanism. Simultaneously 100 ml. 96% alcohol are also heated to boiling in another container and then the two liquids are mixed together with stirring. Now 100 ml. glycerine-1:2-di-fatty acid-3-phosphoric acid amino alcohol ester or glycerine-1:3-di-fatty acid-2-phosphoric acid amino alcohol ester are heated to about 40° C. and the ester is slowly added to the mixture in portions with constant stirring, the temperature of the reaction mixture being kept at 82–87° C. When the addition is completed stirring is continued for another 4 minutes. A stable emulsion is obtained.

What I claim is:

A process for preparing stable alcoholic emulsions of therapeutically useful glycerine di-fatty acid phosphoric acid amino alcohol esters comprising adding a glycerine di-fatty acid phosphoric acid amino alcohol ester to a boiling aqueous alcoholic solution containing at least about 10 percent of grape sugar and stirring the mixture at a temperature of about 82 to 87° C. until an emulsion has been formed, the ratio of ester and sugar being so adjusted that the obtained emulsion contains at least 10 percent of said ester and at least 6 percent of sugar.

References Cited in the file of this patent

UNITED STATES PATENTS

| | | |
|---|---|---|
| 2,198,208 | Musher | Apr. 23, 1940 |
| 2,198,209 | Musher | Apr. 23, 1940 |
| 2,198,211 | Musher | Apr. 23, 1940 |
| 2,221,162 | Ashburn | Nov. 12, 1940 |